(No Model.)

J. J. GIEFFELS & J. THOMAS.
CAR COUPLING.

No. 350,927. Patented Oct. 19, 1886.

Witnesses
Charles F. Burton
Anna E. White

Inventor
John J. Gieffels
Joseph Thomas

UNITED STATES PATENT OFFICE.

JOHN J. GIEFFELS AND JOSEPH THOMAS, OF DETROIT, MICHIGAN.

CAR-COUPLING.

SPECIFICATION forming part of Letters Patent No. 350,927, dated October 19, 1886.

Application filed May 17, 1886. Serial No. 202,494. (No model.)

*To all whom it may concern:*

Be it known that we, JOHN J. GIEFFELS and JOSEPH THOMAS, citizens of the United States, residing at Detroit, in the county of Wayne and State of Michigan, have invented a new and useful Improvement in Car-Couplers, of which the following is a specification.

Figure 1:
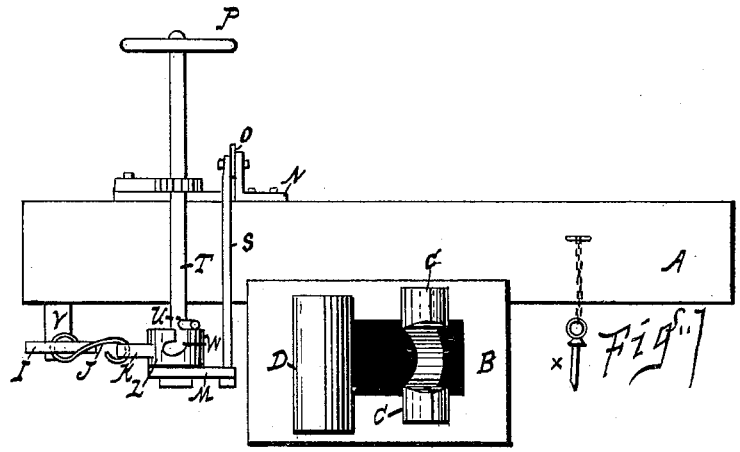
Figure 2:
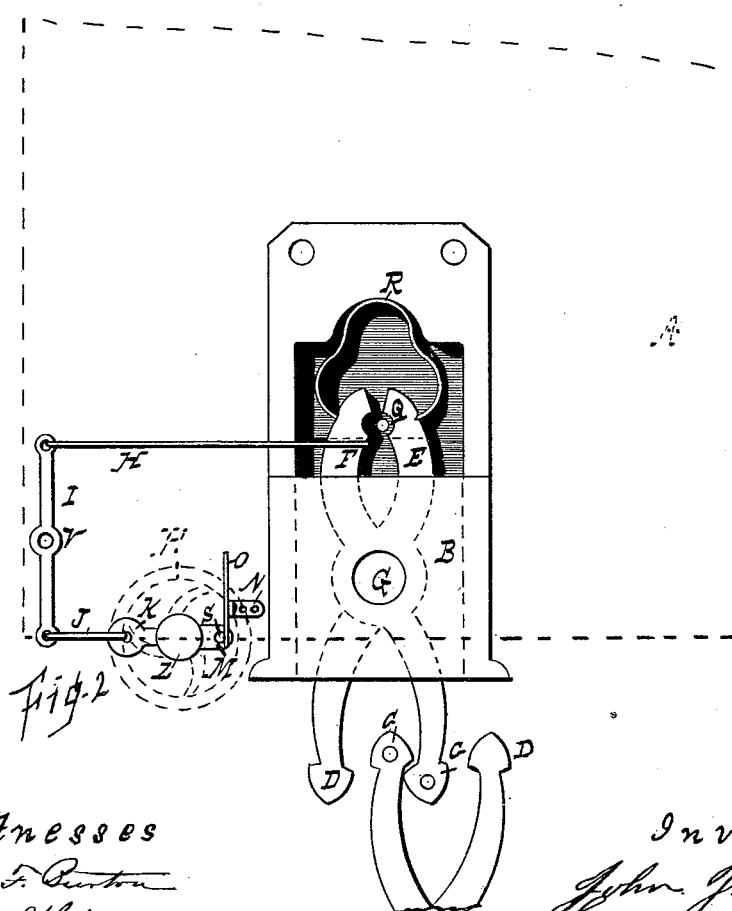

Figure 1 is a front view of our coupler, showing the coupling proper and the adjuncts for uncoupling as mounted on a flat car. Fig. 2 is a plan view of the mechanism, showing the coupling as it would appear with the top of the car removed.

A represents the body of the car; B, the case within which the coupling is contained, which is attached to the bottom of the car and takes the place of the ordinary draw-bar.

P represents the ordinary brake-wheel, and T the brake-staff.

On the king-bolt G, which passes through the bottom of the car, and the case B we mount two levers, E and F, crossing each other and capable of independent motion on the pin G. These are held together at the rear end by a spring, R, shown in the drawings as a clip-spring, though we do not confine ourselves to that style of spring. By the force of the spring R acting upon the rear end of the levers E F, the opposite ends, C and D, are brought toward each other. A coupling precisely similar in all respects is mounted on the car which it is desired to couple with the car shown. Each one of the crossed levers on the end which projects from the draw-bar terminates in an arrow-head, and the coupling is so arranged with respect to the body of the car that the center line from front to rear will pass just inside the forward end of the lever marked C, so that the corresponding lever attached to another car will pass between it and the lever D, and the arrow-head will be embraced between the two arrow-heads C and D, and by the force of the spring R will be tightly held.

On the lower part of the staff of the brake-wheel P we mount a sleeve, Z, having a radial slot, W, in its upper face, into which a pin, U, inserted in the brake-staff fits, when the sleeve Z is drawn up by the lever O, which lever O is mounted on the platform and works to move the sleeve Z through the medium of the links S and M. When the sleeve Z is drawn up so that the pin U fits into the slot W, the rotation of the wheel P, working through the linkage J and K, through the lever I, fulcrumed at V, and the link H, draws the lever F away from the lever E. The pin Q, passing down between the levers F and E, prevents the spring R from causing the lever E to follow F when the latter is drawn sidewise by the rotation of the brake-wheel P. The forward end of the lever F at the arrow-head C is perforated perpendicularly to receive the pin X, and has a portion between the top and bottom cut away to permit the use of a link when it is desired to couple a car fitted with this attachment to cars having the ordinary draw-bar upon them. The uncoupling may also be accomplished without the attachments connecting the lever with the brake-staff, by connecting the lever F by the link H with the lever I, which is then moved by the hand of the operator.

Having thus described our invention, what we claim as novel is—

1. A car-coupler consisting of a pair of crossed levers, the forward end of each of which terminates in an arrow-head, a spring attached to said levers and holding them together, and a pin fastened between the levers and preventing either from following the other when they are forced apart.

2. In combination with a car-coupler of the kind herein described, a linkage connecting one lever of the pair to the brake-staff adapted to spread the jaws of the coupler when the brake-staff is revolved.

3. In combination with a car-coupler of the kind herein described and the brake-staff mounted upon the car, a loose sleeve mounted upon the brake-staff, having a radial slot therein which receives a pin inserted in the brake-staff, and a system of linkages from said loose sleeve to one lever of the coupler.

4. In combination with a coupler of the kind herein described, a loose sleeve mounted upon a brake-staff, and a system of linkages connecting the sleeve with one lever of the coupler, the lever O and connecting-rods S and M, by which the said sleeve is locked upon the brake-staff, substantially as and for the purposes described.

JOHN J. GIEFFELS.
JOSEPH THOMAS.

Witnesses:
ANNA E. WHITE,
CHARLES F. BURTON.